Figure 1:
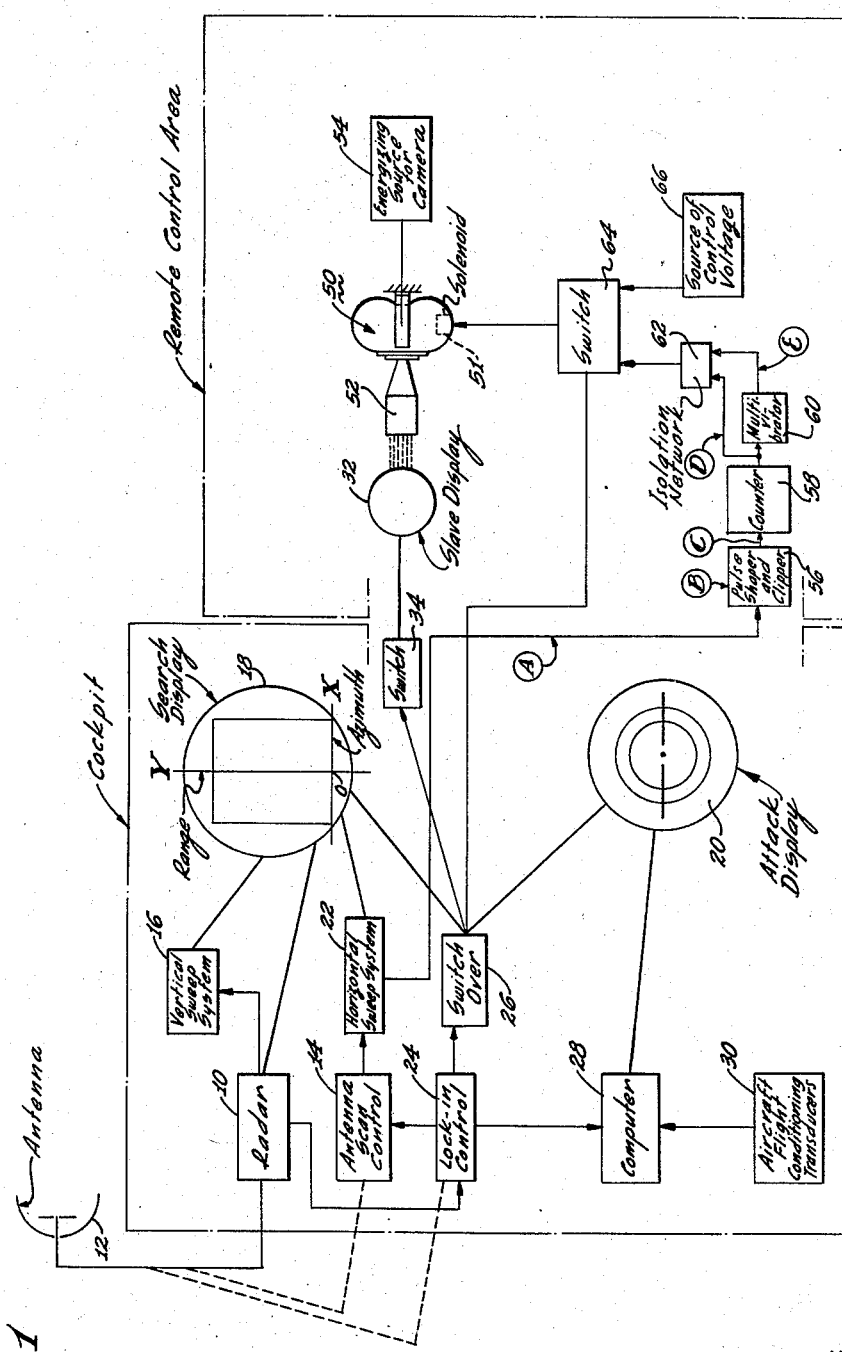

Oct. 20, 1959 — W. E. THORNTON — 2,909,772
PHOTOGRAPHIC RECORDING MEANS
Filed Sept. 30, 1957 — 2 Sheets-Sheet 2

INVENTOR:
William E. Thornton

United States Patent Office 2,909,772
Patented Oct. 20, 1959

2,909,772

PHOTOGRAPHIC RECORDING MEANS

William E. Thornton, Los Angeles, Calif., assignor to Del Mar Engineering Laboratories, Los Angeles, Calif., a corporation Application September 30, 1957, Serial No. 686,919

5 Claims. (Cl. 343—5)

The present invention relates to systems for providing a photographic record of the various displays in a fighter aircraft, or the like; which displays pertain to the radar searching and tracking of a target and which indicate the proper setting of the fire control system of the aircraft just prior to the firing of a missile or other projectile at the target.

All preparations leading up to the actual attack by a modern fighter aircraft on a target are subject to a variety of ingenious electronic controls. For example, the antenna of the radar system in the aircraft is scanned through a plurality of repeated scanning cycles in azimuth and elevation to search the area surrounding the flight path of the aircraft for the presence of a possible target. When a target is discovered, the image of the target is displayed in azimuth, range and elevation with respect to the aircraft. This display appears on the screen of a search oscilloscope which is included in the cockpit of the aircraft.

When the display appears on the screen of the search of the search oscilloscope, the pilot can adjust a lock-in control to the indicated target position, and he can then decouple the antenna scanning system from the antenna and cause the antena to be locked-in on the target under radar control. Now, under the control of the radar system, the antenna precisely tracks the target and accurately follows any changes in the position of the target with respect to the aircraft.

When the locked-in condition of the antenna with the target occurs, the search oscilloscope is de-energized and an attack display oscilloscope is energized. Alternately, the search and attack displays may be exhibited sequentially on the single oscilloscope, as is well known. The attack display oscilloscope is controlled by a computer which desponds to signals from a transducer coupled to the lock-in antenna, and which also responds to signals from other transducers which monitor the various aircraft flight conditions. The computer controls the attack oscilloscope to provide visual indications concerning the accurate firing of a missile or other projectile at the locked-in target. That is, the visual data from the attack display oscilloscope enables the pilot to maneuver the aircraft to the proper position and to fire the projectile at the proper time to cause the projectile to score on the target.

It is evident that for training the pilot and crew of the aircraft, and for testing the effectiveness of the fire control system, it is most desirable that some means be provided for obtaining a permanent record of the visual indications of the search display oscilloscope and of the attack display oscilloscope leading up to the firing of the projectile at the target. Such a permanent record may be later used to determine whether or not, in the event of target misses, the operator accurately responded to the displays. In this manner it is possible to determine whether target misses were due to faulty responses by the operator, or to the equipment itself. If the equipment is at fault, it is possible from the permanent record to determine quantitatively what adjustments are necessary to correct inaccuracies in the system.

For the above reasons, it has been the practice to provide a motion picture camera in the cockpit of the aircraft. The camera in the prior art arrangements was directed at the screen of the attack display oscilloscope, and it was controlled to be activated only when the attack display was exhibited.

No effort was made in the prior art systems to provide a photographic film record of the search display. The reason for this was that the search phase of the operation could continue for a relatively long time, for example, up to an hour or more. It was therefore considered wasteful of film and not practically possible to have a recording made of the search display during the searching period. Also, and even more importantly, the search display itself is not susceptible to a direct recording on a motion picture film. This display proceeds at a relatively low rate in synchronism with the relatively slow scanning of the radar antenna. When it is attempted to make a direct film recording of the display, distorted images occur due to the differences in speed between the rate of successive film frames of the motion picture film drawn through the camera, and the progression of the cyclic scans of the search display.

The prior art systems, therefore, at best provided a partial film record of the sequence of events leading up to the firing of a projectile at a target. The prior systems did not provide a suitable record of the search phase of the operation, but only recorded the attack phase. Much valuable information was lost, therefore, concerning possible deficiencies in the fire control system, or in the skill of the operator, leading up to the actual attack.

For example, with respect to the latter condition, it is often most important that a permanent record be kept of the effectiveness of the crew or system in actually observing an intercepted target; and of the skill, speed and proficiency by which the radar system was locked in with the discovered target.

Another disadvantage in most prior art systems of this general type arises from the fact that in general the instruments in the cockpit of a fighter aircraft, for example, are designed to be in the line of vision of the pilot. The oscilloscope exhibiting the attack displays are included usually in this general group of instruments. Therefore, for a suitable film recording of the attack display, the motion picture camera must be mounted in a position adjacent the pilot's head. This created considerable inconvenience to the pilot. Added to this drawback was the requirement that the lighting in the cockpit often had to be altered from that normally preferred by the pilot so as to provide a satisfactory film record.

The present invention provides an improved system for producing a permanent film record of the search display and of the attack display in the aircraft. This record represents a means for exhibiting everything that takes place up to the actual firing of the missile at the target. It includes a record of the time required originally to pick up the target, the speed and proficiency by which the system was locked-in with the target; and finally a record of the actual attack display up to the moment that the projectile was fired at the target.

The actual film record in the system of the invention is derived from photographing the display of an oscilloscope which is slaved to the search and attack display oscilloscopes, and which is mounted in a compartment remote from the cockpit. It also enables the lighting in the cockpit to be made to the pilot's preferences without affecting the film record in any way.

In accordance with the invention, the motion picture camera is directed at the screen of the slaved oscilloscope. The camera is synchronized with the search display, as will be described, so that it exposes a film frame to the oscilloscope for an interval corresponding to an entire scanning cycle of the search display. This synchronism between the camera and the search display enables a proper undistorted recording of the search display to be made on the motion picture film.

Moreover, a control is included in the system of the invention so that successive film frames of the motion picture film in the camera are exposed to selected ones only of successive search displays corresponding to successive scans of the antenna. It has been found that all the necessary data for practical purposes may be obtained by photographing every fifth scan of the search display, for example. Therefore, the camera in the system of the present invention is controlled, as will be described, so that a successive film frame is exposed to each fourth or fifth, for example, scan of the search display exhibited on the screen of the remote oscilloscope.

When the aircraft radar antenna is locked-on a discovered target and the equipment is switched to the attack phase, the system of the invention automatically slaves the remote oscilloscope to the attack display oscilloscope instead of to the now de-energized search display oscilloscope. The camera is now controlled so that its film proceeds independently of the attack display and at a selected continuous rate. It has been found that with present day systems, for example, a rate of three frames a second is satisfactory to provide a complete record.

Figure 2:
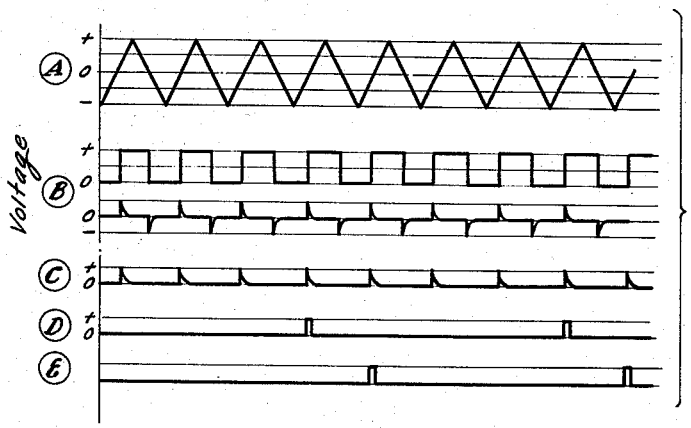
Figure 3:
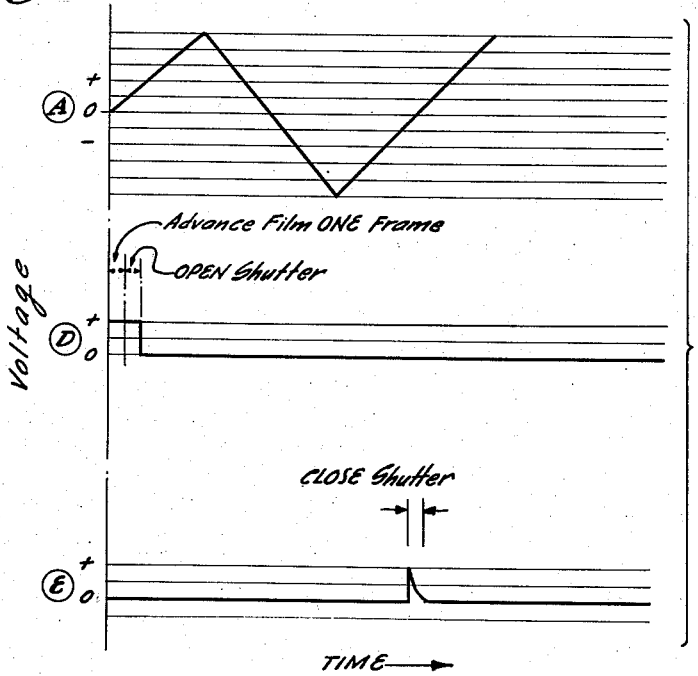

In the drawings:

Figure 1 is a schematic block representation of the fire control system of a typical fighter aircraft, as coupled to the photographic recording system of the present invention to enable a motion picture record to be made of the search display and of the attack display of the fire control system; and Figures 2 and 3 are a series of curves which are useful in explaining the operation of the recording system of the invention.

The schematic representation of Figure 1 shows in block form various components of a fire control system included within the cockpit of a fighter aircraft and, which function to provide the necessary indications to the pilot so that he may maneuver the aircraft and fire a missile, or other projectile, accurately at a target. The representation of Figure 1 also shows various components which are coupled to the above mentioned components in the cockpit, but which are mounted in a remote control area. The latter components in the control area cooperate with one another and with the components of the fire control system to constitute the photographic recording assembly of the present invention.

The aircraft is illustrated as incorporating a usual radar unit 10. This radar unit may be of any known type, and it is coupled in usual manner to an antenna 12. The antenna is movable for scanning purposes, and it is under the control of an antenna scan control 14. This latter control 14 functions in known manner to sweep the antenna 12 through selected degrees of azimuth and elevation with respect to the flight path of the aircraft. The antenna is mounted to be directed forwardly of the aircraft, and the control unit 14 sweeps the antenna back and forth across the flight path of the aircraft through selected azimuth and elevational degrees.

The radar unit 10 is connected to a vertical sweep system 16 of usual construction and which, in turn, controls the vertical sweep of a cathode-ray oscilloscope 18. The oscilloscope 18 has a usual viewing screen on which the search display phase of the operation is exhibited. As will be described, the fire control system includes a second cathode-ray oscilloscope 20 upon which the attack display phase of the operation is exhibited. In some instances, and as mentioned above, it is known to exhibit the two displays sequentially in a single cathode-ray oscilloscope. However, for purposes of convenience of description, these two displays will be considered as exhibited by separate oscilloscopes.

The radar unit 10 is also coupled to the oscilloscope 18 to control the intensity of the cathode-ray beam in the oscilloscope. The antenna scan control is connected to a horizontal sweep system 22 for the oscilloscope 18 which may be of any known construction, and the control unit 14 synchronizes the horizontal sweep system 20 with the azimuth scanning of the antenna in a known manner. The horizontal sweep system generates a sawtooth voltage wave that varies on each side of zero to sweep the cathode-ray beam in the oscilloscope 18 on either side of a central ordinate axis indicated as Y in Figure 1. The cathode-ray beam in the oscilloscope 18 is swept to the right of the ordinate axis as the antenna 12 is swept to the right of the path of the aircraft. Likewise, the beam is swept to the left of the ordinate axis when the antenna is scanned to the left of the axis of the path of the aircraft.

As the beam in the oscilloscope 18 is being moved at a relatively slow rate in the co-ordinate or direction in correspondence with antenna movement and by the horizontal sweep system, the vertical sweep system 16 is triggered and develops a saw tooth output voltage each time the radar unit 10 transmits a pulse. This causes the beam in the oscilloscope to be simultaneously swept at a relatively fast rate in the vertical direction. The net result of the two horizontal and vertical sweeps is a raster composed of a series of vertical lines on either side of the ordinate axis O—Y. The respective echo pulses from the reflection of the transmitted radar pulses from intercepted targets are used to control the cathode-ray beam in the oscilloscope 18, so that one or more bright spots appear on corresponding ones of the vertical lines of the raster.

The distance from the ordinate axis of a line exhibiting such a spot represents the azimuth of the intercepted target, and the length of the line from the co-ordinate axis O—X to the spot represents the range of the target. A suitable marker is usually displayed on the screen to designate the elevation of the aircraft antenna for target interception.

It will now be seen that while the aircraft is proceeding in its search phase, the antenna 12 is scanned through a particular azimuth and elevation sweep, and when a target is detected or intercepted, the image of that target appears on the screen of the oscilloscope 18. As noted, the range and elevation of the target as well as its azimuth with respect to the aircraft, may then be precisely determined.

When the target has been located and its image is displayed on the screen of the oscilloscope 18, the operator may then actuate a lock-in control unit 24. This control 24 is coupled to the antenna scan control unit 14, and it operates to releasse the antenna from the scan control unit so that the position of the antenna can be manually controlled. The antenna is then so controlled until it is directed at the target whose range and elevation and azimuth are indicated on the search display 18. As soon as the manually controlled antenna picks up the target, the lock-in control 18 automatically causes the antenna to lock with the target. The radar unit 10 is coupled to the lock-in control and controls the lock-in control to maintain the antenna lock-in with the target.

The lock-in control unit 24 is coupled to a switch-over unit 26 which may be in the form of a known type of multiple single-pole double-throw electronic switch. The switch-over control 26 functions to de-sensitize the search display oscilloscope 18 and to activate the attack display oscilloscope 20 when the antenna is locked-in with the target.

The lock-in control 24 is coupled to a computer 28, as is a series of transducers 30. The lock-in control 24 feeds data to the computer 28 which relates to the elevation, range and azimuth of the locked-in target.

The transducers 30 feed information into the computer corresponding to aircraft flight conditions, such as the angle of attack, air velocity, yaw, and other variable conditions. The computer 28 responds to the data from the control 24 and from the transducers 30 to provide a display on the attack oscilloscope 20 which indicates to the pilot the correct position to which he must maneuver his aircraft and the precise instant he must fire the projectile to score a hit on the target.

Because the equipment thus far described is known, it is believed that a more detailed description of the fire control system is not necessary here. As noted above, in order to determine the effectiveness of the fire control system and of the pilot or crew actuating the system, it is most desirable that some sort of a permanent record be made of the search display and of the attack display. As also noted, such a record would clearly indicate the effectiveness of the personnel and equipment in first discovering the target, the rapidity and efficiency with which the system was locked in with the target, and the proficiency with which the aircraft was maneuvered and with which the missile or other projectile was released at the target upon the indications of the attack display.

As also noted, both the search display and the attack display may be exhibited from a single oscilloscope, or they may be shown on two different oscilloscopes. When two oscilloscopes are used, it is usual in larger aircraft for the search display oscilloscope to be positioned remotely from the pilot's instruments and to be operated by a separate operator. However, the attack display oscilloscope is part of the pilot's instrumentation, and it must be placed in the line of vision of the pilot. As mentioned above, when efforts were made to photograph the attack display, the necessary position of the motion picture camera and the required lighting effects both were inconvenient to the pilot. Also, attempts to make motion picture recordings of the search display resulted in excessive film requirements and also in distorted representations due to the lack of synchronism between the motion picture film drive and the sweep of the search oscilloscope 18. As noted, it has been found that synchronism is unnecessary insofar as the photographic recording of the attack display is concerned. As previously pointed out, a film speed of the order of three or four frames per second have resulted in adequate photographic records of the attack display.

In accordance with the present invention, a slave oscilloscope 32 is mounted, preferably, in an area of the aircraft remote from the cockpit, and this oscilloscope is coupled to a switching mechanism 34. The switching mechanism 34 has a first operating condition in which all the connections made to the search display oscilloscope 18 are made to identical elements of the slave oscilloscope 32. The switch 34 has a second operating condition in which all the connections made to the attack oscilloscope 20 are made to the slave oscilloscope 32. Therefore, in one operating condition of the switch 34 the slave oscilloscope is slaved to the search display oscilloscope 18, and in a second operating condition of the switch 34 the slave oscilloscope 32 is slaved to the attack oscilloscope 20.

The switch 34, for example, may be of any known type of electronically operated switch. The connections of this switch, and the manner in which it can be controlled between its first and second operating conditions are believed to be sufficiently well known so as to obviate any necessity for a detailed showing of the circuitry involved. Likewise, the manner in which the oscilloscope 32 is slaved through the switch 34 to the search display oscilloscope 18 and to the attack display oscilloscope 20 are also believed to be sufficiently known to one skilled in the art so as to eliminate any need for showing the actual circuit connections. The switch 34 is controlled by the switch-over unit 26, the arrangement being such that whenever the search display oscilloscope 18 is activated the oscilloscope 32 is slaved to that oscilloscope; on the other hand, whenever the switch-over unit 26 is controlled to de-activate the search display oscilloscope 18 and to activate the attack oscilloscope 20, the switch 34 is actuated to its second operating condition in which the slave display oscilloscope 32 is slaved to the attack display oscilloscope 20.

A camera 50 is positioned in the remote control area so that its lens system 52 is directed to the viewing screen of the slave display oscilloscope 32. The camera is connected to an energizing source 54 which supplies the energizing current for the camera drive and for its shutter mechanism.

The camera 50 may be of the type manufactured by the Flight Research Mfg. Co. of Richmond, Virginia (Model 3 or 4), and which is equipped with a capstan type of clutch. In this type of camera, the drive motor is continuously energized, but only when the clutch is activated is the rotation of the drive motor transmitted to the other components of the camera. This clutch is controlled to be actuated by a solenoid indicated by the clock 51. When the solenoid 51 is energized, the clutch is actuated and the drive motor is coupled to the camera components.

When the clutch is so actuated, the drive motor drives the camera components through a series of repeated cycles. In each cycle, the film in the camera is advanced one frame, the shutter is opened for a selected interval, and the shutter is then closed. In the particular model described above, a continuous energizing of the clutch actuating solenoid 51 causes the camera to undergo a series of cycles such as the one described above, and at the rate of, for example, five frames per second.

The horizontal sweep system 22 is connected to a pulse shaper and clipper network 56 of known construction. This latter network is connected to a counter network 58, the output terminal of which is connected to an isolation network 62. The output terminal of the network 58 is also connected to a multivibrator 60 which is also connected to the isolation network 62. The output terminal of the isolation network is connected to a switch 64, as is a source of control voltage 66. The switch-over unit 26 is also connected to the switch 64 to actuate that switch. The switch 64 may be any suitable type of electronic switch. In one operating condition of the switch 64, the output signal from the isolation network 62 is translated to the solenoid 51 which actuates the clutch of the camera. In the other operating condition of the switch 64, however, the voltage from the control source 66 is introduced to the solenoid 51.

Each of the networks 56, 58, 60, 62 and 64 are believed to be sufficiently well known in themselves, so that a detailed description of the circuits involved in these circuits is unnecessary for a completeness of the present description.

As shown in the curve A of Figure 2, the horizontal sweep system 22 develops a saw-tooth voltage output wave which varies in a positive and negative direction on either side of zero axis. This wave is synchronized with the azimuth scanning of the antenna 12. The wave is at zero when the antenna is centered, and it increases in a positive direction when the antenna is shifted to one side of the path of the aircraft, and the wave increases in a negative direction when the antenna is shifted to the other side.

The saw-tooth wave of the curve A of Figure 2 is introduced to the network 56 in which, by known circuitry, it is shaped into pulses which are then differentiated (shown in the curves B). The differentiated pulses shown in the lower curve B correspond to the times at which the saw-tooth wave crosses the zero axis in curve A. Also, in the network 56, the differentiated pulses of the lower curve B are clipped so that the output signal from the unit is as shown in the curve C of Figure 2, this output signal comprising a series of positive pulses corresponding respectively to the positive components of the differentiated pulses of the lower curve B.

The pulses of curve C from the unit 56 are introduced to the counter 58 which may, for example, be a usual train of Eccles Jordan flip-flops for frequency division. The division ratio of the counter 58 is illustrated in Figure 2 as being 4:1, and the counter develops positive output pulses as shown by the curve D from every fourth pulse in curve C. These positive pulses are applied through the isolation network 62 and through the switch 64 (when it is in its first operating condition) to the solenoid 51 in the camera clutch control. The multivibrator 60 responds to each pulse of the curve D to develop in known manner an output pulse occurring in time coincidence with the next succeeding pulse of the curve C. The pulses from the multivibrator 60 are shown in the curve E. These latter pulses are also passed through the isolation network and through the switch 64 (when it is in its first operating condition) to the solenoid 51.

The isolation network 62 serves to permit output pulses from the counter 58 and from the multivibrator 60 both to be introduced to an input terminal of the switch 64 without producing a short circuit around the multivibrator. This isolation network may take the form of any known type of diode or triode type of circuit suitable for this general purpose.

It will be observed from a comparison of the curves A, D and E in Figure 2 that the pulses of the curves D and E coincide with the zero points of the saw-tooth wave of the curve A, and these pulses occur at a time corresponding to the time that the saw-tooth wave is crossing the zero axis in a positive direction.

As more clearly shown in Figure 3, the pulses of the curve D are used to actuate the solenoid in the camera control clutch long enough to cause it to advance the film to a particular frame and to open the shutter. Then, before the camera has a chance to complete its sequence of operations, the clutch is disengaged by the termination of the actuating pulse of the curve D. Therefore, the shutter remains open until the antenna has swept completely through its azimuth scanning arc. Then, a pulse of the curve E actuates the clutch long enough to cause the camera cycle to be completed and the shutter to close.

Also, because of the frequency division effected by the counter 58, the clutch remains de-activated and the camera is not in use except for every fourth scan of the antenna. As noted above, this has been found sufficient for all practical purposes, and enables full information to be attained from the search display without film wastage.

It will be seen that the camera is now synchronized with the sweep of the search display. At the beginning of one complete antenna sweep, the camera film is advanced one frame and its shutter is open. That frame is then exposed to the slave search display on the screen of the oscilloscope 32 throughout the entire time that the antenna is scanned across its arc, and during the entire time that the beam in the oscilloscope 32 is shifted from the left to the right of the viewing screen. Then, the camera shutter is closed and the film-feeding means of the camera is de-clutched until four scans later.

The above sequence of operations occur, of course, only when the switch 64 is activated by the switch-over unit 26 so that the equipment is in the search phase. When the fire control system is moved to the attack phase, the switch-over unit 26 actuates the switch 64 so that voltage from the control source 66 is introduced to the clutch control solenoid of the camera. Also, and as described, the slave display oscilloscope 32 now exhibits the attack display.

For the attack display, it has been found that there is no need to synchronize the camera with the display, and the camera can proceed at the rate, for example, of three or four times a second. The control voltage from the source 66 continuously energizes the clutch solenoid of the camera 50, so that the camera is permitted to proceed through its own cycles at the established rate of three frames a second.

The camera 50 and the display oscilloscope 32 may be mounted on any appropriate bracket so that the lens of the camera is directed at the viewing screen of the oscilloscope. As mentioned above, these components and the associated electronic networks are all positioned in a compartment in the aircraft remote from the cockpit. This enables the lighting in that compartment to be set at that required by the camera and the film used without interfering in any way with the pilot. Also, it provides that camera 50 may be positioned out of the way of the pilot so that it does not interfere with his movements.

The synchronizing of the camera with the search display oscilloscope permits clear and undistorted motion picture film recordings to be made of the search display. Also, the use of the frequency divider 58 permits a full and accurate film record to be obtained but only by the photographing of a sub-multiple of the number of search scans on the oscilloscope 18. This, as previously noted, is practical in that it saves film.

The invention provides, therefore, an improved system and apparatus which enables a full photographic record to be made of the search display and attack display in an aircraft or the like. The system is advantageous in that it may be positioned remotely from the cockpit. Also, the system permits a full record to be made of all the phases of the searching and attack of the target.

Although the now preferred embodiment of the present invention has been shown and described herein, it is to be understood that the invention is not to be limited thereto, for it is susceptible to changes in form and detail within the scope of the appended claims.

I claim:

1. Apparatus for use in conjunction with a radar system, which radar system includes: a movable radar antenna, control means for sweeping the antenna in a predetermined pattern during a target searching mode of operation, a first cathode-ray means for producing a first cathode-ray beam to create a search display during the target searching mode, a sweep system coupled to the antenna control means and to the first cathode-ray means for synchronizing the control of the first cathode-ray beam with the sweep of the radar antenna, control means coupled to the antenna and responsive to signals received thereby for locking the antenna with a selected target to cause the antenna to track the same during a target tracking mode of operation, and second cathode-ray means for producing a second cathode-ray beam to create a display during the target tracking mode; said apparatus including: cathode-ray oscilloscope means positioned remote from said first and second cathode-ray means and having at least one viewing screen, first circuit means for slaving said oscilloscope means with the first cathode-ray means, second circuit means for slaving said oscillscope means with the second cathode-ray means, motion picture camera means positioned to be directed at the viewing screen of the oscilloscope means, and further control means for synchronizing the control of said camera means with the first cathode-ray means during the target searching mode of operation and for rendering the control of the camera means independent of said first and second cathode-ray means during the target tracking mode of operation.

2. Apparatus for use in an aircraft in conjunction with a radar system, which radar system includes: a movable radar antenna, control means for sweeping the antenna in a predetermined pattern during a target searching mode of operation, a first cathode-ray means for producing a first cathode-ray beam to create a search display during the target searching mode, a sweep system coupled to the antenna control means and to the first cathode-ray means for synchronizing the control of the first cathode-ray beam with the sweep of the radar antenna, control means coupled to the antenna and responsive to signals received thereby for locking the antenna with a selected target to cause the antenna to track the same during a target tracking mode of operation, and second cathode-ray means for producing a second cathode-ray beam to create a display during the target tracking mode; said apparatus including: a cathode-ray oscilloscope positioned remote from said first and second cathode-ray means and having a viewing screen, first circuit means for slaving said oscilloscope with the first cathode-ray means, second circuit means for slaving said oscilloscope with the second cathode-ray means, selector switching means having a first operating position for activating the first circuit means and having a second operating position for activating the second circuit means, motion picture camera means positioned to be directed at the viewing screen of the oscilloscope, and further control means for synchronizing the control of said camera means with the first cathode-ray means when said switching means is in its first operating position and for rendering the control of the camera means independent of the first and second cathode-ray means when the switching means is in its second operating position.

3. A system for use in an aircraft including: a movable radar antenna, control means for sweeping the antenna in a predetermined pattern during a target searching mode of operation, a first cathode-ray means for producing a first cathode-ray beam to create a search display during the target searching mode, a sweep system coupled to the antenna control means and to the first cathode-ray means for synchronizing the control of the first cathode-ray beam with the sweep of the radar antenna, control means coupled to the antenna and responsive to signals received thereby for locking the antenna with a selected target to cause the antenna to track the same during a traget tracking mode of operation, a second cathode-ray means for producing a second cathode-ray beam to create a display during the target tracking mode, a cathode-ray oscilloscope positioned remote from the said first and second cathode ray means and having a viewing screen, first circuit means for slaving said oscilloscope with the first cathode-ray means, second circuit means for slaving said oscilloscope with the second cathode-ray means, selector switching means having a first operating position for activating the first circuit means and having a second operating position for activating the second circuit means, motion picture camera means positioned to be directed at the viewing screen of the oscilloscope, and further control means for synchronizing the control of said camera means with the first cathode-ray means when said switching means is in its first operating position and for rendering the control of the camera means independent of the first and second cathode-ray means when the switching means is in its second operating position.

4. A system for use in an aircraft including: a movable radar antenna, control means for sweeping the antenna in a repetitive cyclic scanning pattern during a target searching mode of operation, a first cathode-ray means for producing a first cathode-ray beam for creating a search display during the target searching mode, a sweep system coupled to the antenna control means and to the first cathode-ray means for synchronizing the control of the first cathode-ray beam with the repeated scanning cycles of the radar antenna, control means coupled to the antenna and responsive to signals received thereby for locking the antenna with a selected target to cause the antenna to track the same during a target tracking mode of operation, and second cathode-ray means for producing a second cathode-ray beam to create a display during the target tracking mode, a cathode-ray oscilloscope positioned remote from said first and second cathode-ray means and having a viewing screen, circuit means including a selector switch for selectively slaving said oscilloscope with said first cathode-ray means during the searching mode of operation and with the second cathode-ray means during the tracking mode of operation, motion picture camera means positioned to be directed at the viewing screen of the oscilloscope, and further control means coupled to said sweep system for synchronizing the control of said camera means with the first cathode-ray means during the target searching mode of operation and for rendering the control of the camera means independent of said first and second cathode-ray means during the target tracking mode of operation, said further control means causing the motion picture camera means to expose successive frames of a motion picture film therein to the screen of the oscilloscope, with each such frame being so exposed for an interval corresponding to an entire scanning cycle of the antenna.

5. The system defined in claim 4 in which said further control means includes a frequency divider to cause successive frames of the motion picture film to be exposed to the screen of the cathode ray oscilloscope at intervals corresponding to some sub-multiple of the repeated scanning cycles of the radar antenna.

References Cited in the file of this patent

UNITED STATES PATENTS

| 2,584,175 | Williams | Feb. 5, 1952 |
| 2,586,772 | Ashby et al. | Feb. 26, 1952 |
| 2,737,652 | White et al. | Mar. 6, 1956 |
| 2,779,017 | Land et al. | Apr. 22, 1957 |
| 2,832,072 | Hales et al. | Apr. 22, 1958 |